United States Patent
Walters et al.

(10) Patent No.: US 12,224,882 B2
(45) Date of Patent: Feb. 11, 2025

(54) SYSTEM AND METHOD FOR TUNNELING NETWORK REQUESTS TO A DEVICE VIA A PERSISTENT CONNECTION

(71) Applicant: Domatic, Inc., Palo Alto, CA (US)

(72) Inventors: Andrew Walters, Castroville, CA (US); Peter Macdonald, Foster City, CA (US); Gladys Wong, Fremont, CA (US); James Armand Baldwin, Palo Alto, CA (US)

(73) Assignee: Domatic, Inc., Palo Alto, CA (US)

( * ) Notice: Subject to any disclaimer, the term of this patent is extended or adjusted under 35 U.S.C. 154(b) by 372 days.

(21) Appl. No.: 17/964,255

(22) Filed: Oct. 12, 2022

(65) Prior Publication Data

US 2023/0112657 A1 Apr. 13, 2023

Related U.S. Application Data

(60) Provisional application No. 63/255,367, filed on Oct. 13, 2021.

(51) Int. Cl.
*H04L 12/46* (2006.01)
*H04L 67/1004* (2022.01)

(52) U.S. Cl.
CPC ...... *H04L 12/4641* (2013.01); *H04L 67/1004* (2013.01)

(58) Field of Classification Search
CPC ....... G06F 9/45558; G06F 2009/45583; G06F 2009/45595; H04L 12/4633; H04L 12/2856; H04L 12/2876; H04L 12/4641; H04L 47/125; H04L 49/70; H04L 63/0218; H04L 63/029; H04L 63/0807; H04L 63/0281; H04L 63/126; H04L 67/1004; H04L 67/148; H04L 67/2876; H04L 67/289; H04L 67/51; H04L 67/561; H04L 67/563

See application file for complete search history.

(56) References Cited

U.S. PATENT DOCUMENTS

| | | | | |
|---|---|---|---|---|
| 7,788,404 | B2 * | 8/2010 | Hesselink | H04L 63/08 709/227 |
| 9,483,473 | B2 * | 11/2016 | Ansel | G06F 11/2097 |
| 11,075,981 | B2 * | 7/2021 | Park | H04L 49/70 |
| 11,582,153 | B2 * | 2/2023 | Lewin | H04L 45/10 |

(Continued)

OTHER PUBLICATIONS

F5, BIG-IP® Local Traffic Manager™: Implementations, Version 11.6, 243 pages, Dec. 28, 2017.*

*Primary Examiner* — Frank Duong
(74) *Attorney, Agent, or Firm* — Larisa Migachyov

(57) ABSTRACT

This invention allows an end user ("client") to access one of any number of devices via a server (or cluster of server instances). Each device may be in a different physical location and different location on the Internet or other network. Each device might also be behind a router or firewall that makes direct access to the device impossible. Clients may optionally be authenticated to ensure they are authorized to access a particular device, and devices may also be authenticated to verify their identity to prevent spoofing. Access to a device is achieved by tunneling network requests over a persistent connection that the device establishes when it first comes online.

19 Claims, 2 Drawing Sheets

(56) References Cited

U.S. PATENT DOCUMENTS

| | | | |
|---|---|---|---|
| 2002/0078371 A1* | 6/2002 | Heilig | H04L 67/56 |
| | | | 726/4 |
| 2018/0063233 A1* | 3/2018 | Park | H04L 49/70 |
| 2020/0272525 A1* | 8/2020 | Radunovic | G06F 9/5083 |
| 2022/0129516 A1* | 4/2022 | Shribman | H04L 69/40 |

* cited by examiner

SYSTEM AND METHOD FOR TUNNELING NETWORK REQUESTS TO A DEVICE VIA A PERSISTENT CONNECTION

CROSS-REFERENCE TO RELATED APPLICATIONS

The present application takes priority from Provisional App. No. 63/255,367, filed Oct. 13, 2022, which is incorporated herein by reference.

BACKGROUND

Field of the Invention

The present disclosure generally relates to the field of network-connected devices, and more particularly to methods and techniques for a network-connected device to set up and maintain a persistent connection through which network requests may be tunneled.

Background of the Invention

As the Internet of Things becomes more developed, security and authentication become more important. More and more devices need to be accessed via the Internet. A client, such as an end user or an automated service, may need to access a device, such as a sensor, a networked light switch or actuator, a kitchen appliance, a scientific apparatus of some kind, or any other devices that make up the Internet of Things. Many such devices are on private networks or behind firewalls for extra security.

Sometimes, a client may need to access a device through a firewall and to set up a persistent connection to the device—for example, to continuously receive data from a sensor or to control a scientific apparatus. The connection may need to be maintained for a certain period of time.

In some situations, some clients may be authorized to access a device and some are not. It is important to be able to authorize access to a device quickly and easily while preventing unauthorized access.

In some situations, multiple devices and multiple clients may exist in a system. It is important to be able to quickly and easily connect the clients to the devices.

A need exists for a method for maintaining a persistent and secure connection to a device.

SUMMARY OF THE INVENTION

In an aspect of the invention, the method of the present invention comprises establishing a persistent connection between a device and a server in order to connect a client to the device, wherein the client is connected to the Internet and the device is connected to a private network with at least one server (in an embodiment of the invention, the private network may be separated from the Internet by a firewall). The device is turned on and connects to a first server instance. The first server instance also connects to a port that is accessible from the private network and not accessible from the outside. An association between the device, the first server instance, and the port is then recorded in memory. This may be done in a proxy database (located on a server instance or on a separate server) or via a load balancer.

If a network request to access the device is received from a client, it is routed to a second server instance (which may be the same or different from the first server instance). The second server instance is then used to check whether the client is authorized to access the device (in an aspect of the invention, this is done by authenticating the client through a signed token stored in a cookie). If it is, the second server instance looks up the association between the device, the first server instance, and the port, and establishes a connection to the first server instance and the port. The first server instance is then used to proxy the network request to the connection between the second server instance and the first server instance. On the device, the network connection is routed to an application or service running on the device. In an embodiment, it is routed to a loopback interface to make it appear to be an ordinary network connection to applications running on the device.

If a second network request to access the device is received from a second client, it is routed to a third server instance (which may be the same or different from the first and second server instances). The third server instance is then used to look up and connect to the first server instance and port associated with the device, and the first server instance proxies the network request to the connection between the third server instance and the first server instance. Similarly, the network connection is routed to an application or service running on the device.

A second device is handled similarly to the device. The second device is turned on, identifies itself, and is connected to a fourth server instance and a second port (again, the fourth server instance may be identical to, or different from, any of the first three instances). This is then stored in memory. The only limitation is that the combination of server instance and port be unique for each device. If a network request to access the second device is received from a client, it is routed to a fifth server instance (which may be distinct from the fourth server instance or identical to it), which is then used to look up the fourth server instance and the second port and connect to it. The network request is then proxied to the connection between the fourth server instance and the fifth server instance.

In an embodiment of the invention, the network requests are routed via a load balancer. The load balancer may also be used to look up the first server instance and the port associated with the device.

A client (which may be a user or a cloud server) may make a network request to access the device by including a domain name in the header of a web request, or may make a network request to access the device by using a web header, using a cookie, accessing the load balancer through an IP address or a port, or using an endpoint.

In an embodiment of the invention, a client can access at least one of the servers directly if authorized to do so.

In an embodiment of the invention, using the second server instance to establish a connection to the first server instance and the port creates a persistent connection. This may be a TCP connection or a pair of HTTP connections.

In an embodiment of the invention, the network request comprises at least the following information: a network request ID, a type of action to be performed (open, close, data, acknowledge), and any data required by the network request.

In an embodiment of the invention, the device identifies itself before connecting to the first server instance.

In an embodiment of the invention, the device is configured to allow access to services only through the loopback interface.

In an embodiment of the invention, if the device is slow to consume data, it can send a message to the first server instance to pause data transmission until accumulated data is consumed. The first server instance then throttles the connection from the second server instance to manage network bandwidth and buffering.

LIST OF FIGURES

DETAILED DESCRIPTION OF THE PREFERRED EMBODIMENT

An object of the present invention is to provide a system and method for allowing a client to access any one of a number of devices via a server or a cluster of server instances, even if each device is in a different physical location or different location on the Internet or other network.

Another object of the present invention is to provide a system or method for allowing multiple clients to access multiple devices over the same persistent tunneled connection.

Another object of the present invention is to provide a system that can easily authorize or not authorize a client to access each particular device on a network.

For purposes of the present disclosure, a client is defined as either a user or an automated process that is accessing a device. A device is any device that is connected to a network to which network access may be desired, such as a sensor, a scientific apparatus, smart-home automation such as light switches or thermostats, a kitchen appliance, and so on. A client may connect to a device in order to receive data from it, to send data to it, or to control it in some way.

Figure 1:
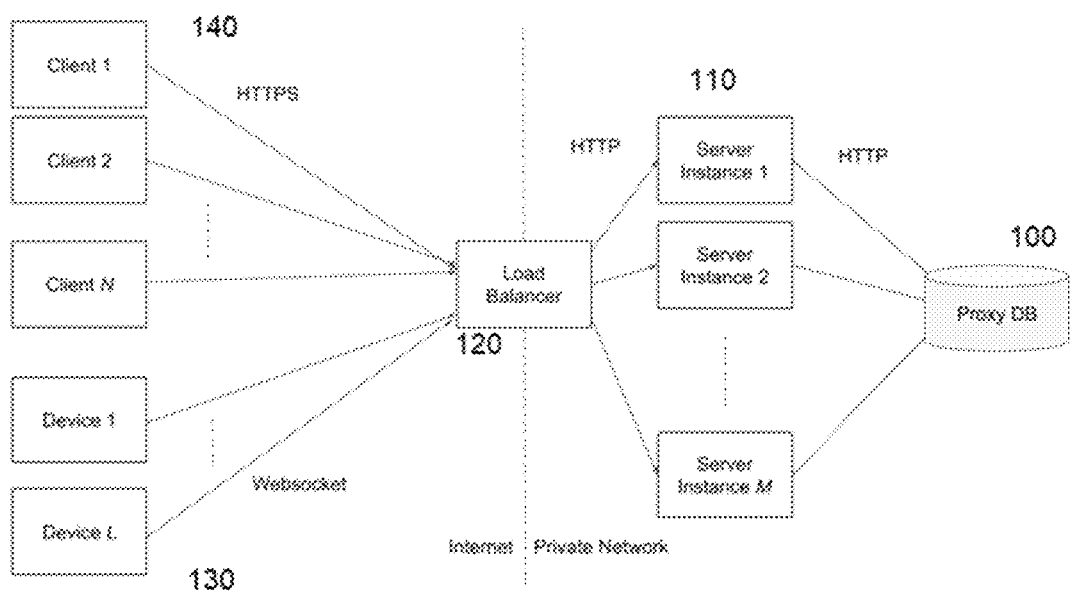
FIG. 1 is a block diagram of an embodiment of the present invention.

FIG. 1 shows a block diagram of an aspect of the present invention. Clients 140 reside on the Internet, as do devices 130. In other embodiments, some or all of the devices 130 can be located on a private network or behind a firewall, as can some or all of the clients 140. In some embodiments, at least one of the devices 130 is on a network that does not normally allow access from the Internet due to firewalls or Network Address Translation. In other embodiments, at least one of the devices 130 is on the Internet. A load balancer 120 connects to at least one server instance 110, located on a private network. The server instances 110 are connected via HTTP to a proxy database.

Figure 2:
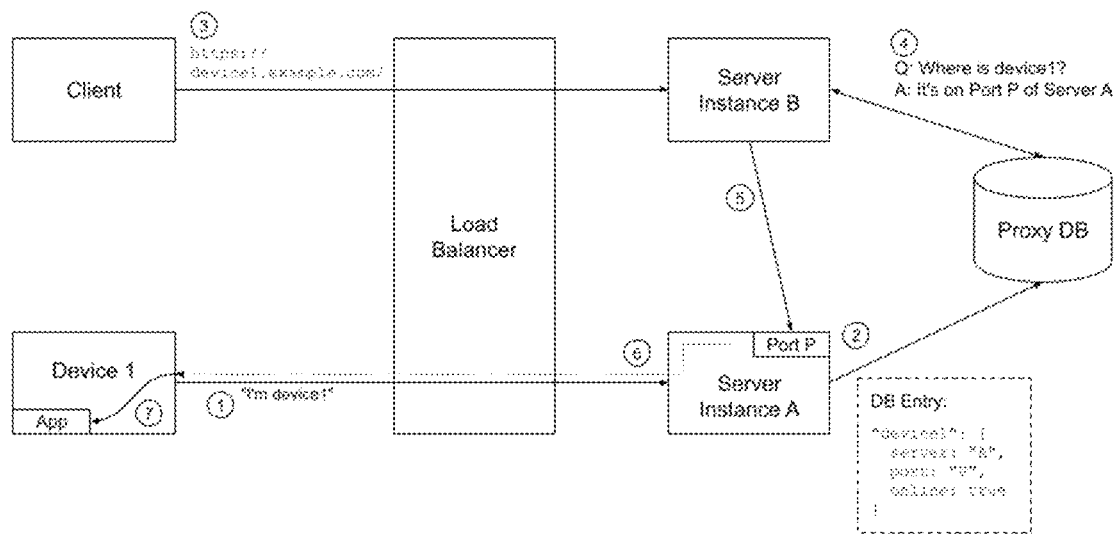
FIG. 2 is a diagram explaining the method of the present invention, with the steps marked in circled numbers.

FIG. 2 shows an aspect of the tunneling process of the present invention. When a device comes online 1, it establishes a connection with the server URL and identifies (authenticates) itself. The load balancer 120 assigns this connection to one of the server instances. In this aspect of the invention, the socket.io library is used to manage the connection, though the underlying connection is a Websocket.

A device can identify itself in various ways. In the preferred embodiment, the device self-reports its identity. The device may also verify the authenticity of the server; in the preferred embodiment, the device uses HTTPS to verify the server and then presents a unique cryptographically signed token to the server to authenticate itself. In another embodiment, 2-way TLS is used for mutual authentication.

After the server instance is assigned, it begins listening 2 on a port that can be accessed from the private network, but not from outside. It also adds an entry to the proxy database 100 that associates the hostname of the device with the assigned server instance and the assigned port.

A client then makes a network request 3 to access the device. In the current implementation, it is a web request over HTTP(S). The requests can also be long-lived, such as websockets, which allow a device to send realtime notifications back to the client. In its request, the client specifies which device to access via domain name. For example, if the server cluster can be accessed via app.example.com, then Device 1 could be accessed by specifying a host of device1.app.example.com in the web request. Other methods could also be used, such as using different web headers, cookies, accessing the load balancer through different IP addresses and/or ports, or using different endpoints (e.g. https://www.example.com/device1/ . . . )

It must also be noted that other network requests besides web requests may also be used with the present invention.

The load balancer then routes the client request to one of the server instances (Server Instance B, in the Figure). The server instance may be the same or different from the one that the device connected to. Once the server instance sees that the requested host refers to a device, it looks up 4 the device entry in the proxy database. In the Figure, this would be Server Instance A and Port P.

The server instance then checks to see if the client is authorized to access the device. In this embodiment, this is done by comparing the client's roles and other attributes with the device's attributes. For example, a device belonging to a particular organization might be accessible only from a client with an "admin" role belonging to the same organization. As another example, one client may be authorized to access devices in a particular building, while another client may not.

If the client is authorized, Server Instance B then opens a connection 5 to Server Instance A and Port P, as stated in the device entry in the proxy database, and proxies the incoming request to the new connection. This is done by opening a new TCP connection between the two server instances; it could also be done by having server instances have persistent connections between each other, or using a connectionless protocol such as UDP. Server Instance A then transparently tunnels 6 the proxied request over the persistent socket.io connection. Multiple simultaneous requests can be proxied over a single persistent connection.

On the device, the tunneled network connection is routed to the loopback interface 7 so that it appears as an ordinary network connection to applications or services running on that device. This allows any device to be used with the system of the present invention without the need to specially configure the device. In an embodiment, the device is configured to allow access to services only through the loopback interface. This allows only authorized access to services, even on a potentially insecure network.

While this is not shown in the Figure, a second client can access the device the same way. A second network request is received and routed to a server instance by the load balancer. This may be an entirely different server instance, Server Instance B, or Server Instance A. This server instance then checks to see if the second client is authorized to access the device; if the client is authorized, this server instance then looks up the server instance and port associated with the client (i.e. Server Instance A and Port P), opens a connection to Server Instance A and Port P, and proxies the incoming request to the new connection. Server Instance A then transparently tunnels the proxied request over the persistent socket.io connection. Similarly, the system can accommodate a third, fourth, or any other number of clients.

Similarly, another device may be accessed by a client the same way. The second device would need to be connected to its own server instance (for example, Server Instance D) and its own port (for example, Port P2). This would then be entered into a database. A client would then be able to access the second device by connecting to a server instance (which may be distinct from Server Instance D), which then looks up the connection between the second device and Server Instance D and Port P2, connects to Server Instance D and Port P2, and proxies the incoming request to the new connection. Server Instance D then tunnels that proxied request over the persistent socket.io connection.

As stated above, Server Instance D may be the same as Server Instance A or B, or may be a distinct server instance. It is not necessary for each device to set up its own distinct server instance to practice the present invention. It is sufficient that each pair of instance and port be distinct and associated with the device. For example, (A, P); (A, P2); (D, P); (D, P2) could all be acceptable combinations of server instance and port for four different devices.

In summary, each device sets up its own tunnel to a cloud server where all the server instances reside; there is one tunnel for each device. The authentication of the clients happens in the cloud (i.e. on the server instances), and once the client is authenticated, the system determines what tunnel the client needs to access.

As pertaining to establishing and maintaining a persistent connection from a device, the only hard requirement is that the connection from the device must support reliable two-way communication between the device and the server cluster. For practical implementations, it is often necessary for such a connection to be able to traverse firewalls and Network Address Translation (NAT) devices that may exist on the device's network. For this reason, a type of device-initiated TCP connection is preferable for practicing the present invention. In other embodiments, the transport layer connection is not truly persistent but can be reestablished readily. In an embodiment, a pair of long-polling HTTP connections (one send, one receive) is used, even though they may have a limitation on how long they are held open.

In an embodiment, a "connectionless" protocol is used instead of a connection. This is consistent with practicing the present invention as long as it ensures reliability of message delivery. In an embodiment, the UDP network protocol is used. Any other similar protocol may be used as well.

A major advantage of the present invention is the ability to multiplex multiple network requests over the single persistent connection. In this embodiment of the present invention, this is done by formatting the network request to include at least the following:
   a. Network request ID
   b. Type of action (i.e. open, close, data, acknowledge)
   c. Any data In the preferred embodiment, packaging these messages to send over a connection can be done through an existing library. In an embodiment, the messages may be packaged "from scratch".

In an aspect of the invention, multiple services may also be multiplexed over the single persistent connection. In an embodiment, in addition to proxying HTTP(S) requests, the server cluster could also be configured to proxy SSH sessions to allow authorized users to log into the device.

In an embodiment of the invention, the persistent connection may be used not just by a client to connect to the device, but by the device to initiate connections to the server instance.

In an embodiment, the system can support flow control to minimize buffering on each end. For example, if a tunneled connection on the device side is slow to consume data, the device sends a message through the tunnel to tell the server to pause its side of the connection. Once the buffered data is consumed on the device side, another message is sent to resume the connection.

In the above-described embodiment, a proxy database is used to track which server instance is connected with a particular device. However, in alternate embodiments, a database is not used. The only requirement for practicing the present invention is that there has to be some way for a server instance to look up the connection information for a device. This information may be stored in a database, on a separate server, on a single "master" or "primary" server instance, distributed or replicated among server instances, or on the load balancer itself.

In an embodiment, the connection lookup information does not reside on persistent storage, but rather is stored in the in-memory storage. If a server instance goes down, connections to it will get terminated, and then, the devices will reconnect and their lookup information will get regenerated.

If there is only a single server instance and no load balancer used in the present invention, the connection lookup information could be maintained on that single instance. In this case, of course, the server instance would not need to be stored as part of the connection information.

While a load balancer is shown in the Figure, it is not a required part of the invention. Any other way of assigning server instances could also be used. In an embodiment, the load balancer could "steer" client requests for a particular device to the server instance maintaining the connection to that device, to reduce traffic on the server cluster's internal network. In another embodiment, the connection lookup, proxying, and tunneling are all performed within the load balancer.

The load balancer required to practice the present invention may use any commonly available load balancing algorithms and methods. For example, it may use the round robin method, the least connections method, the least time method, a hash method to minimize redistribution of loads, an IP hash to use the client's IP address to determine which server receives the request, or a "random with two choices" method, wherein two server instances are picked at random and the least connections algorithm is used to pick one out of the two.

The server instances preferably reside on a cloud server or group of servers located on a private network. The present invention is not limited as to how many server instances may be used.

An exemplary embodiment is described above. It is to be understood that reasonable equivalents to the elements of the above-described embodiment are to be included in the disclosure, and that the present invention is only limited by the claims.

The invention claimed is:

1. A method of establishing a persistent connection between a client and a device, wherein the client is connected to the Internet and wherein the device is connected to a private network, wherein the private network comprises at least one server, comprising:
   a. turning on a device;
   b. connecting the device to a first server instance;
   c. using the first server instance to listen on a port accessible from the private network, wherein the port is not accessible from the outside;
   d. recording in memory an association between the device, the first server instance, and the port;

e. if a network request to access the device is received from the client, performing the following actions:
  i. routing the network request to a second server instance, wherein the second server instance is one of the following: a server instance distinct from the first server instance, the first server instance;
  ii. using the second server instance to check whether the client is authorized to access the device;
  iii. using the second server instance to look up the first server instance and port associated with the device;
  iv. using the second server instance to establish a connection to the first server instance and the port;
  v. using the first server instance to proxy the network request to the connection between the second server instance and the first server instance;
  vi. on the device, routing the network connection to an application or service running on the device.

2. The method of claim 1, further comprising:
a. receiving a second network request to access the device from a second client;
b. performing the following actions:
  i. routing the second network request to a third server instance, wherein the third server instance is one of the following: a server instance distinct from the first server instance, the first server instance;
  ii. using the third server instance to check whether or not the second client is authorized to access the device;
  iii. using the third server instance to look up the first server instance and port associated with the device;
  iv. using the third server instance to connect to the first server instance and port associated with the device;
  v. using the first server instance to proxy the network request to the connection between the third server instance and the first server instance;
  vi. on the device, routing the network connection to an application or service running on the device.

3. The method of claim 1, further comprising:
a. turning on a second device;
b. connecting the second device to a fourth server instance, wherein the fourth server instance is one of the following: a server instance distinct from the first, second, and third server instances, the first server instance, the second server instance, the third server instance;
c. using the fourth server instance to listen on a second port accessible from the private network, wherein the second port is not accessible from the outside;
d. recording in memory an association between the second device, the fourth server instance, and the second port;
e. if a network request to access the second device is received from the client, performing the following actions:
  i. routing the network request to a fifth server instance, wherein the fifth server instance is one of the following: a server instance distinct from the fourth server instance, the fourth server instance;
  ii. using the fifth server instance to check whether the client is authorized to access the second device;
  iii. using the fifth server instance to look up the fourth server instance and second port associated with the second device;
  iv. using the fifth server instance to establish a connection to the fourth server instance and the second port;
  v. using the fourth server instance to proxy the network request to the connection between the fifth server instance and the fourth server instance;
f. on the second device, routing the network connection to an application or server running on the device.

4. The method of claim 1, wherein the step of routing the network request to a second server instance is performed by using a load balancer.

5. The method of claim 1, wherein the step of recording in memory an association between the device, the first server instance, and the port, and the step of using the second server instance to look up the first server instance and port associated with the device are performed by using a proxy database.

6. The method of claim 5, wherein the proxy database is located on a separate server.

7. The method of claim 5, wherein the proxy database is located on at least one server instance.

8. The method of claim 5, wherein the step of using the second server instance to look up the first server instance and the port is performed by using a load balancer.

9. The method of claim 1, wherein the client makes a network request to access the device by including a domain name in the header of a web request.

10. The method of claim 1, wherein the client makes a network request to access the device by one of the following: using a web header, using a cookie, accessing the load balancer through an IP address, accessing the load balancer through a port, or using an endpoint.

11. The method of claim 1, wherein the step of using the second server instance to check whether the client is authorized to access the device is performed by authenticating the client through a signed token stored in a cookie.

12. The method of claim 1, wherein the step of using the second server instance to establish a connection to the first server instance and the port creates a persistent connection.

13. The method of claim 1, wherein the connection between the second server instance and the first server instance is one of the following: a TCP connection, a pair of HTTP connections.

14. The method of claim 1, wherein the network request comprises the following information:
a. a network request ID;
b. a type of action to be performed, wherein the type of action is selected from a set comprising the following: open, close, data, acknowledge;
c. any data required by the network request.

15. The method of claim 1, wherein the step of connecting the device to a first server instance comprises identifying the device.

16. The method of claim 1, wherein the private network is separated from the Internet by a firewall.

17. The method of claim 1, wherein the step of routing the network connection to an application or service running on the device comprises routing the network connection to a loopback interface running on the device.

18. The method of claim 17, wherein the device is configured to allow access to services only through the loopback interface.

19. The method of claim 1, further comprising:
a. if the device is slow to consume data, using the device to send a message to the second server instance to pause data transmission until accumulated data is consumed;
b. when accumulated data is consumed, using the device to send a message to the second server instance to resume data transmission.

* * * * *